United States Patent
Ding et al.

(10) Patent No.: US 8,619,341 B2
(45) Date of Patent: Dec. 31, 2013

(54) METHODS AND SYSTEMS TO PROVIDE PROXY SCAN SERVICES TO LEGACY DEVICES

(75) Inventors: Yi Ding, Saratoga, CA (US); Lifen Tian, Sunnyvale, CA (US); Hitoshi Sekine, Los Altos, CA (US)

(73) Assignee: Ricoh Company, Ltd, Tokyo (JP)

( * ) Notice: Subject to any disclaimer, the term of this patent is extended or adjusted under 35 U.S.C. 154(b) by 527 days.

(21) Appl. No.: 12/570,843

(22) Filed: Sep. 30, 2009

(65) Prior Publication Data
US 2011/0075225 A1    Mar. 31, 2011

(51) Int. Cl.
*H04N 1/04* (2006.01)
(52) U.S. Cl.
USPC ............................... 358/474; 709/229
(58) Field of Classification Search
None
See application file for complete search history.

(56) References Cited

U.S. PATENT DOCUMENTS

| | | | |
|---|---|---|---|
| 2005/0021795 A1* | 1/2005 | Kuroshima et al. | 709/229 |
| 2005/0046887 A1* | 3/2005 | Shibata et al. | 358/1.13 |
| 2007/0162586 A1* | 7/2007 | Kim | 709/223 |
| 2007/0245013 A1* | 10/2007 | Saraswathy et al. | 709/223 |
| 2008/0079985 A1* | 4/2008 | Ferlitsch | 358/1.15 |
| 2009/0240697 A1* | 9/2009 | Fenelon | 707/10 |

* cited by examiner

*Primary Examiner* — Twyler Haskins
*Assistant Examiner* — Helen Q Zong
(74) *Attorney, Agent, or Firm* — Duft Bornsen & Fettig, LLP

(57) ABSTRACT

Systems and methods are disclosed for enabling legacy devices to consistently and reliably operate within a distributed scan environment using proxy scan services. A proxy scan service is communicatively coupled between a scan management service and a scanner. Information transmitted between the scan management service and the scanner is intercepted at the proxy scan service, where the scan management service recognizes a first format message for the information and the scanner recognizes a second format message for the information. The information is converted at the proxy scan service between the first format message and the second format message. The transmission between the scan management service and the scanner is completed using the converted information.

19 Claims, 9 Drawing Sheets

METHODS AND SYSTEMS TO PROVIDE PROXY SCAN SERVICES TO LEGACY DEVICES

BACKGROUND

1. Field of the Invention

The invention relates generally to providing distributed scan services to legacy devices, and more specifically, for providing support for legacy devices in a Microsoft Distributed Scan environment using proxy scan services.

2. Discussion of Related Art

In a Microsoft Distributed Scan Management environment (DSM), administrators manage scanning services for organizations containing many users. DSM is implemented in Windows Server 2008 R2 and uses Web Services on Devices (WSD) protocol to integrate various devices into the environment.

In DSM, the various devices interact with a Microsoft Distributed Scan Server and a Microsoft Scan Management Console to provide solutions for scanning and post processing of scan data. The various devices (e.g., scanners, Multi-Function Printers, etc.), utilize Microsoft Distributed Scan Device (DSD) and Microsoft Distributed Scan Processing (DSP) compliant services to communicate with the Microsoft Distributed Scan Server and the Microsoft Scan Management Console. The DSD specification describes how scanning devices and services operate in a distributed scanning environment, and specify the device control model. The DSP specification describes how the scanning devices, services, and post processing of scan data operate in the DSM environment. A more detailed discussion of DSM, including DSD, DSP, and Post Scan Processing protocols can be found on-line at "http://msdn.microsoft.com/en-us/library/dd980751.aspx".

To support distributed scan, existing devices (i.e., legacy devices) need to implement the new specifications for DSD and DSP. This presents a roadblock for legacy devices to participate in the DSM environment when the legacy devices are non-compliant with one or more elements of the DSD and/or DSP specification.

Thus, it is an ongoing challenge to enable legacy devices to consistently and reliably operate within a DSM environment.

SUMMARY

The present invention solves the above and other problems, thereby advancing the state of the useful arts, by providing systems and methods for legacy devices to consistently and reliably operate within a DSM environment using proxy scan services.

One aspect hereof provides a method for operating a scanning system, where the scanning system includes a scanner and a computing device operable to execute a proxy scan service, and where the proxy scan service is coupled between a scan management service and the scanner. According to the method, information transmitted between the scan management service and the scanner is intercepted at the proxy scan service, where the scan management service recognizes a first format message for the information, and the scanner recognizes a second format message for the information. The information is converted at the proxy scan service between the first format message and the second format message. The transmission between the scan management service and the scanner is completed using the converted information.

Another aspect hereof provides for a scanning system. The scanning system includes a computing device and a scanner. The computing device is operable to execute a proxy scan service, where the proxy scan service is adapted to be communicatively coupled with a scan management service, and where the scan management service is operable to recognize a first format message. The scanner is adapted to be communicatively coupled with the proxy scan service, where the scanner is operable to recognize a second format message. The proxy scan service is operable to intercept information transmitted between the scan management service and the scanner, is further operable to convert the information between the first format message and the second format message, and is further operable to complete the transmission between the scan management service and the scanner using the converted information.

BRIEF DESCRIPTION OF THE DRAWINGS

The same reference number represents the same element or same type of element on all drawings.

DETAILED DESCRIPTION OF THE DRAWINGS

FIGS. 1 through 10 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
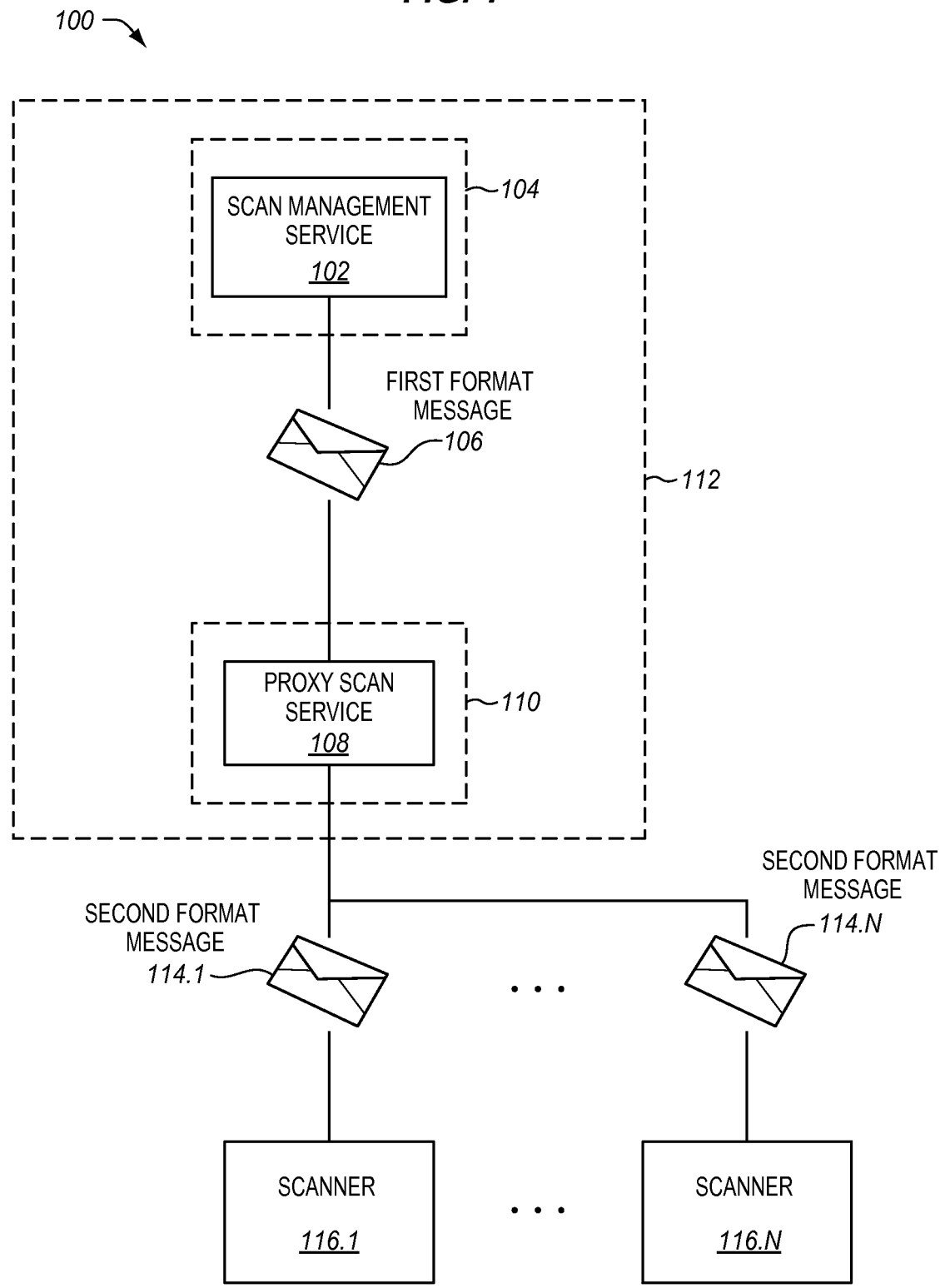
FIG. 1 is a block diagram of an exemplary scanning system operating a proxy scan service in an embodiment of the invention.

FIG. 1 is a block diagram of an exemplary scanning system 100 operating a proxy scan service 108 in an embodiment of the invention. Scanning system 100 includes a scan management service 102, one or more scanners 116.1-116.N, and a proxy scan service 108. Scan management service 102 operates to communicate with one or more scanners 116.1-116.N, route scanned documents, run scan processes, and log scan-related events. Proxy scan service 108 is communicatively coupled between scan management service 102 and one or more scanners 116.1-116.N. In some embodiments, scan management service 102 executes on a computing device 104 and proxy scan service 108 executes on a computing device 110. In another embodiment, both scan management service 102 and proxy scan service 108 execute on a common computing device 112.

In scanning system 100, proxy scan service 108 operates to intercept and convert information transmitted between scan management service 102 and one or more scanners 116.1-

116.N. For example, when scan management service 102 recognizes a first format message 106 and scanner 116.1 recognizes second format message 114.1, proxy scan service 108 operates to convert the information between first format message 106 and second format message 114.1. In like manner to scanner 116.1 and second format message 114.1, scanner 116.N recognizes second format message 114.N. Thus, proxy scan service 108 also operates to convert the information exchanged between first format message 106 recognized by scan management service 102 and second format messages 114.N recognized by scanner 116.N.

In some embodiments, first format message 106 is a DSP and/or a DSD format message and second format message 114.1 is non-compliant with the DSP and/or DSD format message. In other embodiments, second format message 114.1 recognized by scanner 116.1 is one or more of a Twain format message, a Windows Image Acquisition (WIA) format message, an Image and Scanner Interface Specification (ISIS) format message, a Scanner Access Now Easy (SANE) format message or an email format message. In these embodiments, proxy scan service 108 operates to convert the DSP and/or DSD format messages into second format messages 114.1 recognized by scanner 116.1, thus enabling the exchange of information between scan management service 102 and scanner 116.1. For example, first format message 106 may be a DSP message for scanner 116.1 operating as a Twain scanner. Thus, proxy scan service 108 operates to convert the DSP message corresponding to first format message 106 to a Twain format message corresponding to second format message 114.1. In like manner, when transmissions are directed from scanner 116.1 to scan management service 102, proxy scan service 108 operates to convert a Twain format message corresponding to second format message 114.1 to a DSP message corresponding to first format message 106.

In other embodiments, proxy scan service 108 intercepts Post Scan Processing (PSP) data from scan management service 102 and converts the PSP data into a second format message 114.1 recognized by scanner 116.1. PSP data comprises information related to certain types of post processing operations that are performed on scan data and information related to various scan settings used by scanner 116.1 to generate the scan data. For example, the PSP data may contain information for generating a scan job on scanner 116.1. The job information may include scan resolutions, color space formats (e.g., RGB24), etc.

In some embodiments, scanner 116.1 may not support the specific scan capabilities (e.g., scan resolution, image format, color space, etc.) specified in the PSP data. Proxy scan service may then identify an alternate scan capabilities supported by scanner 116.1, instruct scanner 116.1 to generate the scan data in the alternate scan capability, and convert the scan data from the alternate scan capability to the scan setting specified in the PSP data. For example, scan management service 102 may transmit a PSP scan job for scanner 116.1 specifying 300 dots per inch (DPI) resolution as first format message 106 to proxy scan service 108. Proxy scan service 108 may query scanner 116.1 for its scan capabilities using a number of protocols, such as Web Services for Devices (WSD), simple network management protocol (SNMP), and other such protocols. In response to the query, scanner 116.1 may indicate to proxy scan service 108 that scanner 116.1 supports a scan resolution of 150 DPI and not the 300 DPI specified in the PSP scan job. Thus, proxy scan service 108 may instruct scanner 116.1 to perform a scan and to generate scan data in the 150 DPI resolution. Proxy scan service 108 may then receive the scan data in the 150 DPI resolution and convert the scan data to the 300 DPI resolution as specified in the PSP scan job. In like manner, the PSP scan job for scanner 116.1 may specify one or more different image formats or color space settings that may not be supported by scanner 116.1. In this case, in response to proxy scan service 108 identifying an alternate image format or color space supported by scanner 116.1, proxy scan service 108 may then instruct scanner 116.1 to perform a scan and to generate scan data in the alternate scan capability. Proxy scan service 108 may then receive the scan data in the alternate scan capability and convert the scan data into the scan settings as specified in the PSP scan job.

One skilled in the art will recognize that FIG. 1 is illustrative in nature, and that specific blocks or modules depicted in scanning system 100 may be grouped in fewer or more exemplary modules as a matter of design choice. Additionally, one skilled in the art will recognize that any specific blocks detailed within scanning system 100 may comprise any number of circuits, processors, memory systems (both persistent and volatile), programmable devices, hard disks, flash based persistent storage, battery backed up random access memory (RAM), or any other system or apparatus operable to perform the functionality recited herein with respect to FIG. 1.

Figure 2:
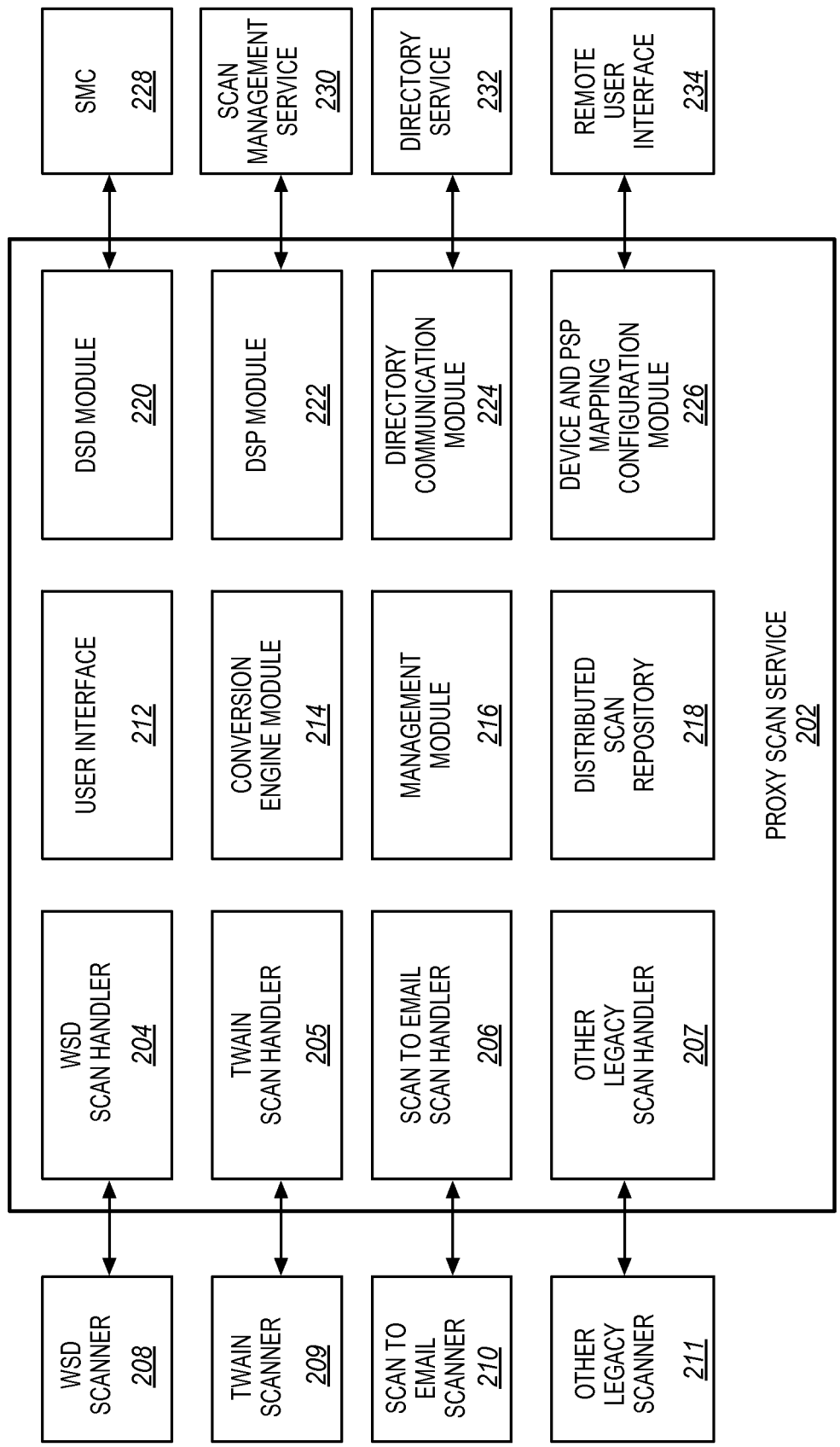
FIG. 2 is a block diagram of an exemplary modular decomposition of a proxy scan service in an embodiment of the invention.

FIG. 2 is a block diagram of an exemplary modular decomposition of a proxy scan service 202 in an embodiment of the invention. Proxy scan service 202 is communicatively coupled with a Web Services for Devices (WSD) scanner 208, a Twain scanner 209, a scan-to-email scanner 210, and other legacy scanner 211. Proxy scan service 202 is also communicatively coupled with a Microsoft Scan Management Console (SMC) 228, a scan management service 230, a directory service 232, and a remote user interface 234.

SMC 228 generally provides a central administration point for managing devices within the DSM environment for users and groups. Scan management service 230 generally provides services related to scanning functions, such as converting scanned image data to other formats that are not provided by a scanner, and/or delivering the processed data to destination locations. Directory service 232 operates to provide information within the DSM environment for locating, managing, administering, and organizing devices and network resources. Directory service 232 may also operate to provide authentication services to users. Authentication services operate to provide access to DSM resources to some users and deny DSM resources to other users. Remote user interface 234 operates to provide a user interface for devices within the DSM environment, which do not include a user interface.

Proxy scan service 202 includes a number of scan handlers 204-207, each communicatively coupled with one of the corresponding scanners 208-211. The scan handlers 204-207 operate to communicate with corresponding scanners 208-211 using second format messages recognized by the respective scanner. A WSD scan handler 204 is communicatively coupled with WSD scanner 208. WSD scan handler 204 implements a WSD scan client to communicate with WSD scanners, such as WSD scanner 208. WSD scan handler 204 also subscribes to WSD scanner events; uses scan ticket information from PSP data to create a scan job, retrieves scanned images from WSD scanner 208, and forwards the scan data to a DSP module 222 via a conversion engine module 214.

Twain scan handler 205 is communicatively coupled with Twain scanner 209. Twain scan handler 205 implements a Twain driver for communicating with Twain scanner 209, retrieves scan data from Twain scanner 209, and forwards the scan data to DSP module 222 via conversion engine module 214.

Scan to email handler 206 is communicatively coupled with scan to email scanner 210. Scan to email handler 206 implements Simple Mail Transfer Protocol (SMTP) service (or other well-known email protocols), to communicate with scan to email scanner 210. Scan to email handler 206 receives emails with attached scan images from scan to email scanner 210 and then forwards the scan images to DSP module 222 via conversion engine module 214.

Other legacy scan handler 207 is communicatively coupled with other legacy scanner 211. Other legacy scan handler 207 and other legacy scanner 211 represent other scanning devices using other protocols that may be exchanged and converted via the other modules of proxy scan service 202. In one exemplary embodiment, other legacy scanner 211 may include a device that is compatible with DSM such that proxy scan service 202 may provide a single portal for coupling all scanning devices to the DSM environment. Other legacy scan handler 207 and modules of proxy scan service 202 may then simply provide a pass through capability devoid of any need for conversion or translation.

Conversion engine module 214 enables different types of scanning devices to work in a DSM environment. Conversion engine module 214 provides interfaces for scan handlers 204-207 to query PSP data as well as forward image data via DSP module 222 to scan management service 230. Conversion engine module 214 also enables a user to select scan setting and destination information through remote user interface 234 for any scanners 208-211 that do not include a user interface. Conversion engine module 214 also enables authentication for scanners 208-211. Conversion engine module 214 communicates with a directory communication module 224, which is communicatively coupled with directory service 232 in order to retrieve PSP data. Conversion engine module 214 also provides image content processing based on scan settings in the PSP data. If one or more scanners 208-211 do not support scan settings defined in the PSP data, conversion engine module 214 operates to convert scan image data based on settings specified in the PSP data. To further illustrate the previous example of scan resolution conversion, WSD scan handler 204 may be utilized to generate a 150 DPI scan job for WSD scanner 208, and forward the scan data generated to conversion engine module 214. Conversion engine module 214 may then convert the scan data from 150 DPI to 300 DPI to meet the desired scan resolution specified in the PSP data.

Directory communication module 224 has knowledge of the PSP data format defined in directory service 232. Directory communication module 224 uses Lightweight Directory Access Protocol (LDAP) to retrieve PSP data from directory service 232. Directory communication module 224 also provides programming interfaces for other modules within proxy scan service 202.

DSD module 220 processes DSD Web Service Definition Language (WSDL) request messages and communicates with SMC 228. DSD module 220 interfaces with conversion engine module 214 to retrieve scanner information (e.g., scanner 208-211 capabilities). DSD module 220 also communicates with a management module 216 to log scanner status and physical scan job status.

A DSP module 222 within proxy scan service 202 composes DSP WSDL request messages and communicates with scan management service 230. DSP module 222 also interfaces with conversion engine module 214 to retrieve scan data, and management module 216 to log post scan job status.

A user interface 212 within proxy scan service 202 handles remote user interface requests from remote user interface 234. The user requests may include various jobs and scan setting information related to activities performed within the DSM environment. User interface 212 communicates with a DSM repository 218 for monitoring scanner 208-211 status and job status. User interface 212 interfaces with a device and PSP mapping configuration module (DPMC) 226 to configure the mappings between scanners 208-211 and PSP data and distributed scan repository 218 stores the mapping information. Mapping information provides a means for conversion between first format messages and second format messages. For example, the PSP data may include various scan resolution settings and color space settings for Twain scanner 209. Distributed scan repository 218 may then store mapping information to map the scan resolution settings and the color space settings from the PSP data format to a Twain format recognized by Twain scanner 209. Distributed scan repository 218 also stores usage information for scanners 208-211, user information, and scan job status information.

DPMC module 226 handles the mappings between PSP data and scanners 208-211. DPMC module 226 allows an administrator via remote user interface 234 to configure the mapping between PSP data (e.g., scan setting, scan destination) to scanners 208-211. The operation of the various modules of proxy scan service 202 will be further described by way of example with respect to FIGS. 3-8.

Although the proxy scan service 202 of FIG. 2 has been described using specific modules, one skilled in the art will recognize that the modules may be combined or decomposed into other embodiments as a matter of design choice. In addition, although scan management service 102 of FIG. 1 and scan management service 230 of FIG. 2 may in some embodiments have been described with respect to specific Microsoft based DSM environments, one skilled in the art will recognize that additional embodiments may exist for scan management service 102 and/or scan management service 230. The addition embodiments may include, for example, Ricoh ScanRouter or Canon ImagRunner Document Distribution solutions, Notable Solutions scanning solutions, e-copy scanning solutions, Omtool scanning solutions, Kofax scanning solutions, and/or Paper River scanning solutions operating as scan management service 102 and/or scan management service 230.

Figure 3:
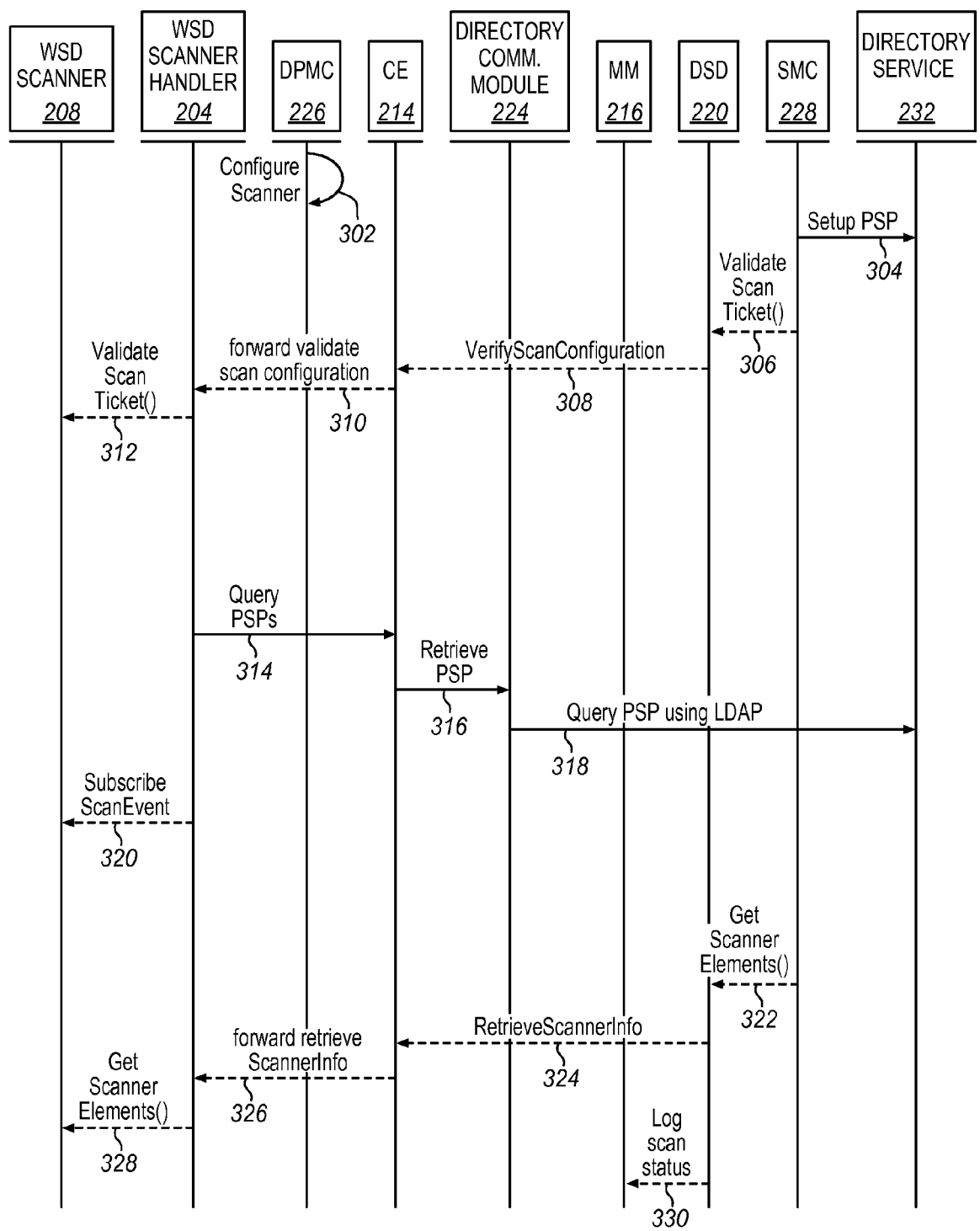
FIGS. 3-8 illustrate exemplary communication and processing flows utilizing the proxy scan service of FIG. 2 in an embodiment of the invention.

FIG. 3 illustrates an exemplary communication and processing flow utilizing proxy scan service 202 of FIG. 2 in an embodiment of the invention. In FIG. 3, proxy scan service 202 interfaces with WSD scanner 208, SMC 228, and directory service 232 for configuration and management functions.

FIG. 3 shows roles of each module to configure proxy scan service 202 for use with WSD scanner 208 in a device initiate mode, although a user interface mode is also supported. User authentication is performed by proxy service 202 using directory service 232 when WSD scanner 208 does not support user authentication.

In FIG. 3, an administrator creates a general PSP for WSD scanner 208 and stores the PSP data in directory service 232. SMC 228 may verify the scan ticket via DSD module 220. The administrator also configures WSD scanner 208 IP address for the general PSP data using DPMC module 226 and remote user interface 234.

Conversion engine module 214 retrieves the PSP data by instructing directory communication module 224 to perform a query to directory service 232, and caches the PSP data to reduce network traffic. WSD scan handler 204 gets the PSP data using the directory communication module 224. WSD scan handler 204 extracts the destination location information from the PSP data and includes the destination location information as a scan destination in WSD scan operation requests. The WSD scan handler 204 subscribes to events for WSD scanner 208 for receiving notifications when the user initiates a scan. WSD scan handler also receives scanner status information, scans job status information, and logs the information to the management module 216. SMC 228 can retrieve WSD scanner 208 capabilities and scanner status from DSD module 222. Specific steps of this configuration and management activity are detailed below.

In flow 302, an administrator configures WSD scanner 208 IP address using remote user interface 234.

In flow 304, an administrator creates PSP data for WSD scanner 208 using SMC 228. SMC 228 stores this PSP data in directory service 232.

In flow 306, SMC 228 transmits a DSD message containing information about scan setting information for WSD scanner 208.

In flow 308, DSD module 220 forwards the scanner information and the scan setting information to conversion engine module 214.

In flow 310, conversion engine module 214 forwards the scanner information and the scan setting information to WSD scan handler 204.

In flow 312, WSD scanner handler 204 generates and transmits a WSD message to WSD scanner 208 containing the information of flow 308.

In flow 314, WSD scan handler 204 retrieves PSP data from conversion engine module 214 related to WSD scanner 208 for scan event subscriptions In flow 316, conversion engine module 214 retrieves PSPs from directory communication module 224 and caches the PSP data for improved performance.

In flow 318, directory communication module 224 queries directory service 232 using LDAP to retrieve the PSP data.

In flow 320, WSD scan handler 204 transmits a SubscribeScanEvent( ) message to WSD scanner 208.

In flow 322, SMC 228 transmits a GetScannerElements( ) message to DSD module 220. GetScannerElements( ) is a general command that can retrieve scanner capabilities, scanner status, and a description of the scanner.

In flow 324, DSD module 220 forwards the GetScannerElements( ) request to conversion engine module 214.

In flow 326, conversion engine module 214 forwards the GetScannerElements( ) request to WSD scan handler 204.

In flow 328, WSD scan handler 204 generates a WSD message for the GetScannerElements( ) request and transmits the information to WSD scanner 208.

In flow 330, DSD module 220 logs scan status information to management module 216.

Figure 4:
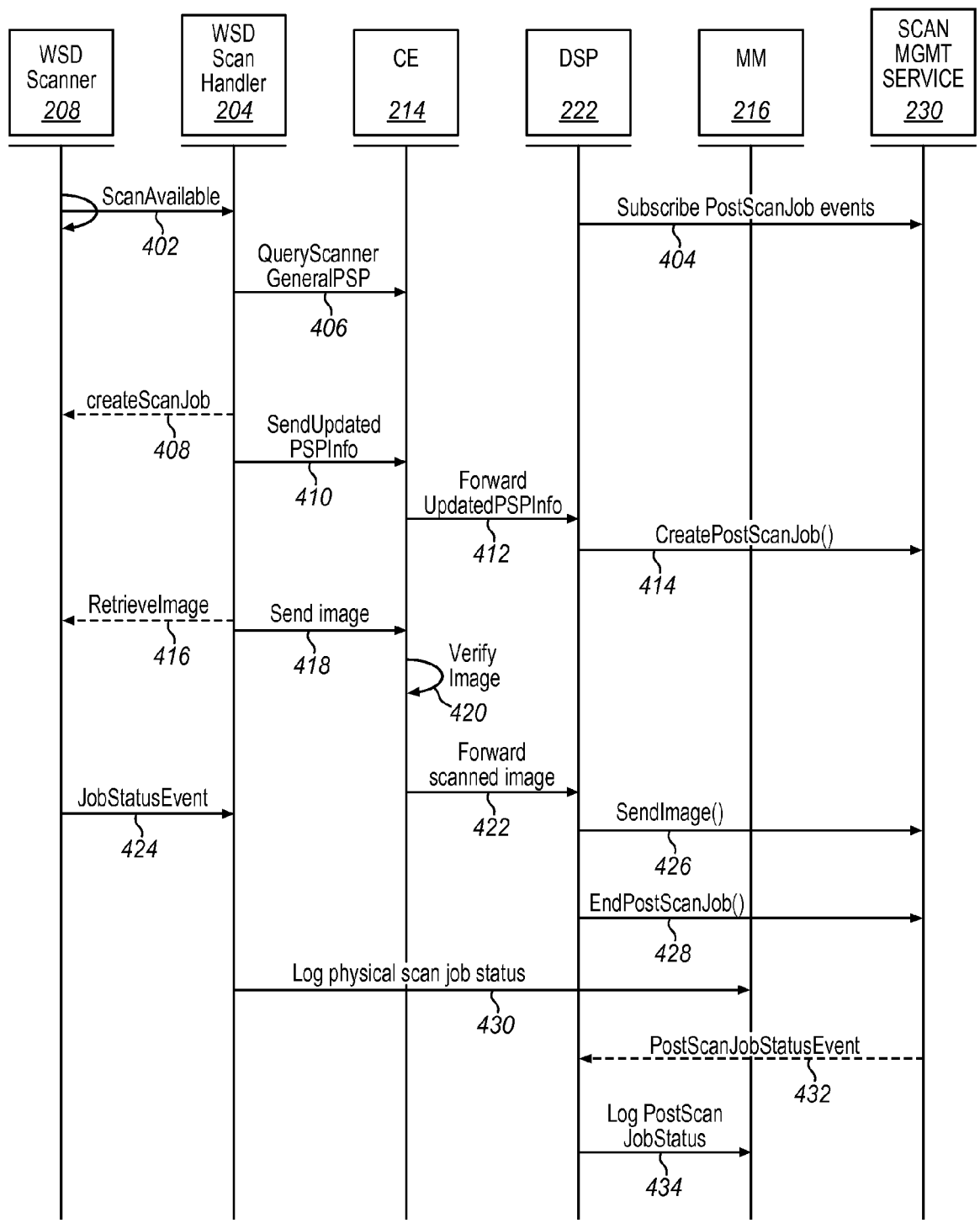

FIG. 4 illustrates an exemplary communication and processing flow utilizing proxy scan service 202 of FIG. 2 in an embodiment of the invention. In FIG. 4, proxy scan service 202 interfaces with WSD scanner 208 and scan management service 230 for operation in a device initiate mode.

In FIG. 4, DSP module 222 subscribes to post scan job events from scan management service 230. A user selects a destination using WSD scanner 208 and starts a scan. WSD scan handler 204 receives a ScanAvailable( ) from WSD scanner 208 after the user initiates a scan. WSD scan handler 204 gets the general PSP data from directory service 232, updates the general PSP data based on the scan settings at WSD scanner 208, and sends the updated PSP data to scan management service 230 for a CreatePostScanJob( ) operation.

After the user initiates a scan on WSD scanner 208, WSD scan handler 204 retrieves the scan data from WSD scanner 208. Conversion engine module 214 verifies the image contents against the general PSP data and processes the image if required. The image is sent to DSP module 222 for a SendImage( ) operation to scan management service 230. After the image is sent, DSP module 222 sends an EndPostScanJob( ) message to scan management service 230. Information about the scan job is logged to management module 216. Specific steps of this scan activity are detailed below.

In flow 402, WSD scanner 208 transmits a ScanAvailable( ) message to WSD scan handler 204. This flow is the result of the SubscribeScanEvent( ) message of flow 302 of FIG. 3. The ScanAvailable( ) message is a notification to WSD scan handler 204 that WSD scanner 208 is ready to send scanned image data to WSD scan handler 204.

In Flow 404, DSP module 222 transmits a message to scan management service 230 to subscribe to post scan job events.

In flow 406, WSD scan handler 204 transmits a query message to conversion engine module 214 to retrieve the PSP information for WSD scanner 208. The PSP data contains predefined scan settings for WSD scanner 208 to use.

In flow 408, WSD scan handler 204 transmits a scan job to WSD scanner 208 based on the information retrieved in flow 406, such as the scan resolution setting in the PSP data.

In flow 410, WSD scan handler 204 transmits updated PSP data based on the actual scan resolution settings used to generate the scan data. The updated PSP data is transmitted to the conversion engine module 214.

In flow 412, conversion engine module 214 forwards the information from flow 410 to DSP module 222.

In flow 414, DSP module 222 transmits a CreatePostScanJob( ) message to Scan management service 230.

In flow 416, WSD scan handler 204 retrieves the scan image data from WSD scanner 208.

In flow 418, WSD scan handler 204 forwards the scan image data to conversion engine module 214.

In flow 420, conversion engine module 214 verifies the image data against the PSP data and processes the image data if necessary (e.g., convert from 150 DPI to 300 DPI).

In flow 422, conversion engine module 214 forwards the processed or original image data to DSP module 222.

In flow 424, WSD scanner 208 updates WSD scan handler 204 with a JobStatusEvent( ) message.

In flow 426, DSP module 222 forwards image data to scan management service 230.

In flow 428, DSP module 222 transmits EndPostScanJob( ) message to scan management service 230.

In flow 430, WSD scan handler 204 transmits the scan job status to management module 216 for logging.

In flow 432, DSP module 222 receives a PostScanJobStatusEvent( ) message from scan management service 230.

In flow 434, DSP module 222 transmits the post scan job status information to management module 216 for logging.

Figure 5:
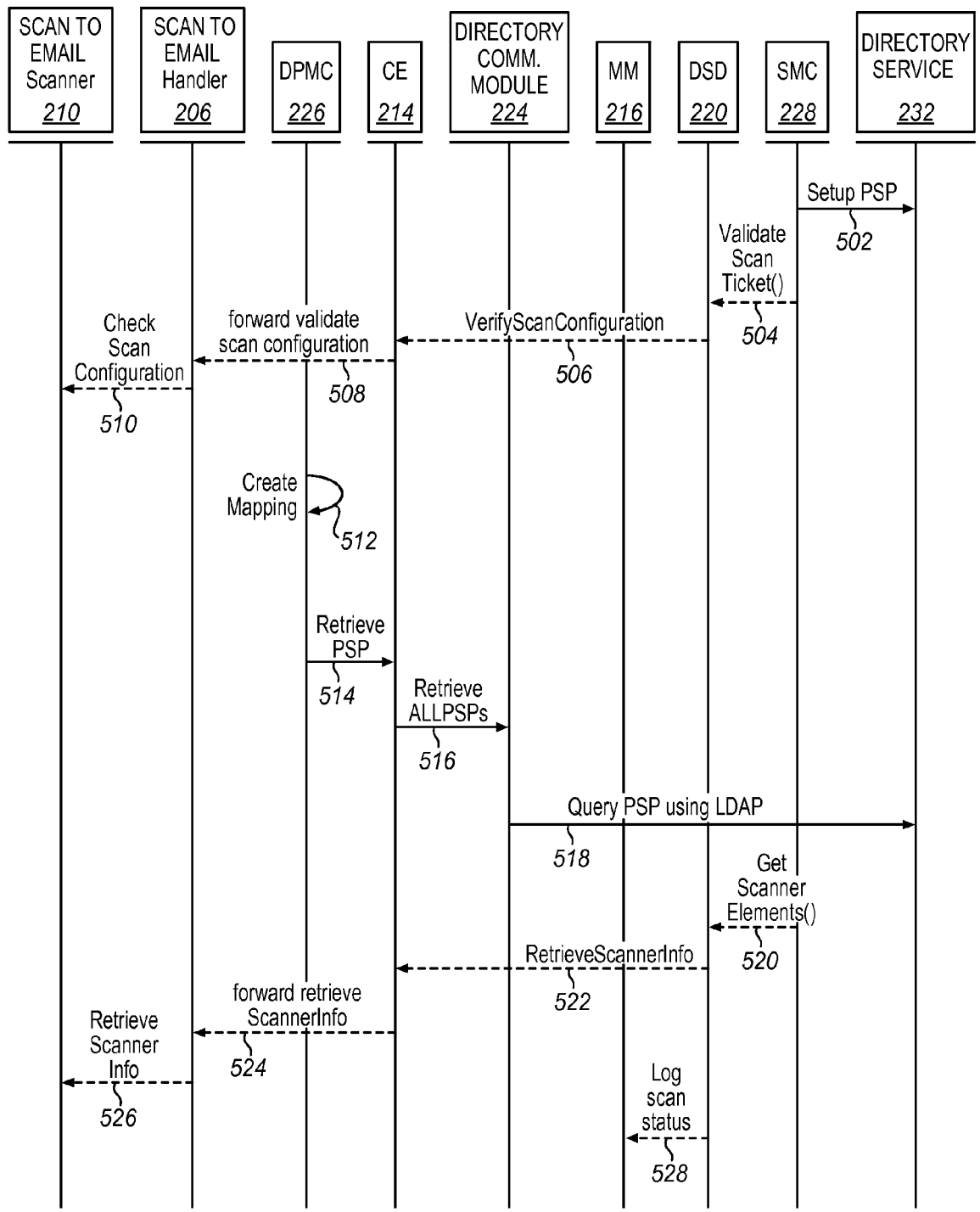

FIG. 5 illustrates an exemplary communication and processing flow utilizing proxy scan service 202 of FIG. 2 in an embodiment of the invention. In FIG. 5, proxy scan service 202 interfaces with scan to email scanner 210, SMC 228, and directory service 232 for configuration and management operations.

Generally, an administrator creates a general PSP for scan to email scanner 210 using SMC 228 and stores the PSP data in directory service 232. SMC 228 may verify the scan ticket for the PSP data via DSD module 220 if the scan to email scanner 210 supports this function. The administrator creates a mapping between the PSP data and scan to email scanner 210 using DPMC 226. The PSP data for scan to email scanner 210 is retrieved from directory service 232 and cached to reduce network traffic. Proxy scan service 202 operates to retrieve capabilities and status for scan to email scanner 210 and forwards the information and the capabilities to SMC 228. Various information about scan to email scanner 210, such as status, is logged to management module 216. Specific steps of this configuration and management activity are detailed below.

In flow 502, an administrator creates a general PSP for scan to email scanner 210 and stores the PSP data in directory service 232.

In flow 504, SMC module 228 transmits a ValidateScanTicket( ) message to DSD module 220.

In flow 506, DSD module 220 forwards scan configuration information to conversion engine module 214.

In flow 508, conversion engine module 214 forwards scan configuration information to scan to email handler 206.

In flow 510 scan to email handler 206 checks the scan settings of scan to email scanner 210.

In flow 512, an administrator creates a mapping between scan to email scanner 210 and PSP data using remote user interface module 234 and DPMC module 226.

In flow 514, DPMC module 226 retrieves the PSP data from conversion engine module 214.

In flow 516, conversion engine module 214 retrieves all PSPs from directory communication module 224.

In flow 518, directory communication module 224 queries directory service 232 for the PSP data.

In flow 520, SMC 228 transmits a GetScannerElements( ) message to DSD module 220.

In flow 522, DSD module 220 transmits a RetrieveScannerinfo( ) message to conversion engine 214.

In flow 524, conversion engine 214 forwards RetrieveScannerinfo( ) message to scan to email handler 206.

In flow 526, scan to email handler 206 forwards the RetreiveScannerinfo( ) message to scan to email handler 210.

Figure 6:
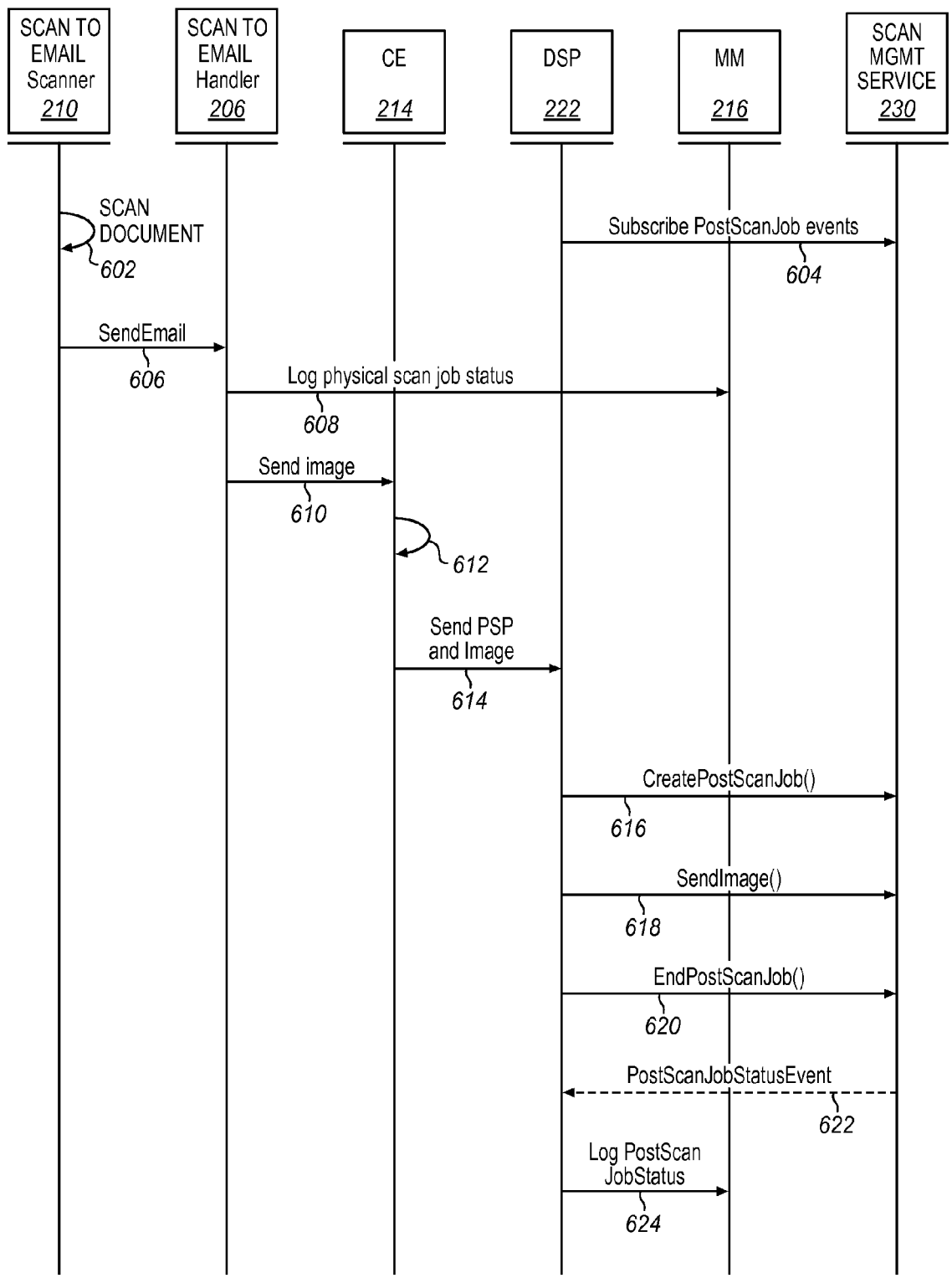

FIG. 6 illustrates an exemplary communication and processing flow utilizing proxy scan service 202 of FIG. 2 in an embodiment of the invention. In FIG. 6, a scenario is detailed whereby proxy scan service 202 is utilized using a device initiate mode for scan to email scanner 210. First, DSP module 220 subscribes to post scan job events to scan management service 230. A user scans a document with scan to email scanner 210. The scanned image is attached to an email and sent to scan to email handler 206. An email service (e.g., an SMTP service) retrieves the scanned image from the email and sends the image to conversion engine module 214. Conversion engine module 214 verifies the image contents against the general PSP data and processes the image if required. Conversion engine module 214 also retrieves the cached PSP data for scan to email scanner 210 and sends the image along with the PSP data to scan management service 230 via DSP module 222. Scan job information is logged to the management module 216. Specific steps of this scan activity are detailed below.

In flow 602, a user scans a document to generate image data.

In flow 604, DSP module 222 subscribes to PostScanJob events with scan management service 230.

In flow 606, scan to email scanner 210 transmits an email including the image data to scan to email handler 206.

In flow 608, scan to email handler 206 logs physical scan job status to management module 216.

In flow 610, scan to email handler 206 transmits the image data to conversion engine module 214.

In flow 612, conversion engine module 214 verifies image data against the PSP data and processes the image data if necessary.

In flow 614, conversion module 214 transmits PSP data and the image data to DSP module 222.

In flow 616, DSP module 222 transmits a CreatePostScanJob( ) message to scan server 230.

In flow 618, DSP module 222 transmits the image data to scan management service 230.

In flow 620, DSP module 222 transmits EndPostScanJob( ) message to scan management service 230.

In flow 622, scan management service 230 transmits a PostScanJobStatusEvent( ) message to DSP module 222.

In flow 624, DSP module 222 logs the post scan job status to management module 216.

Figure 7:
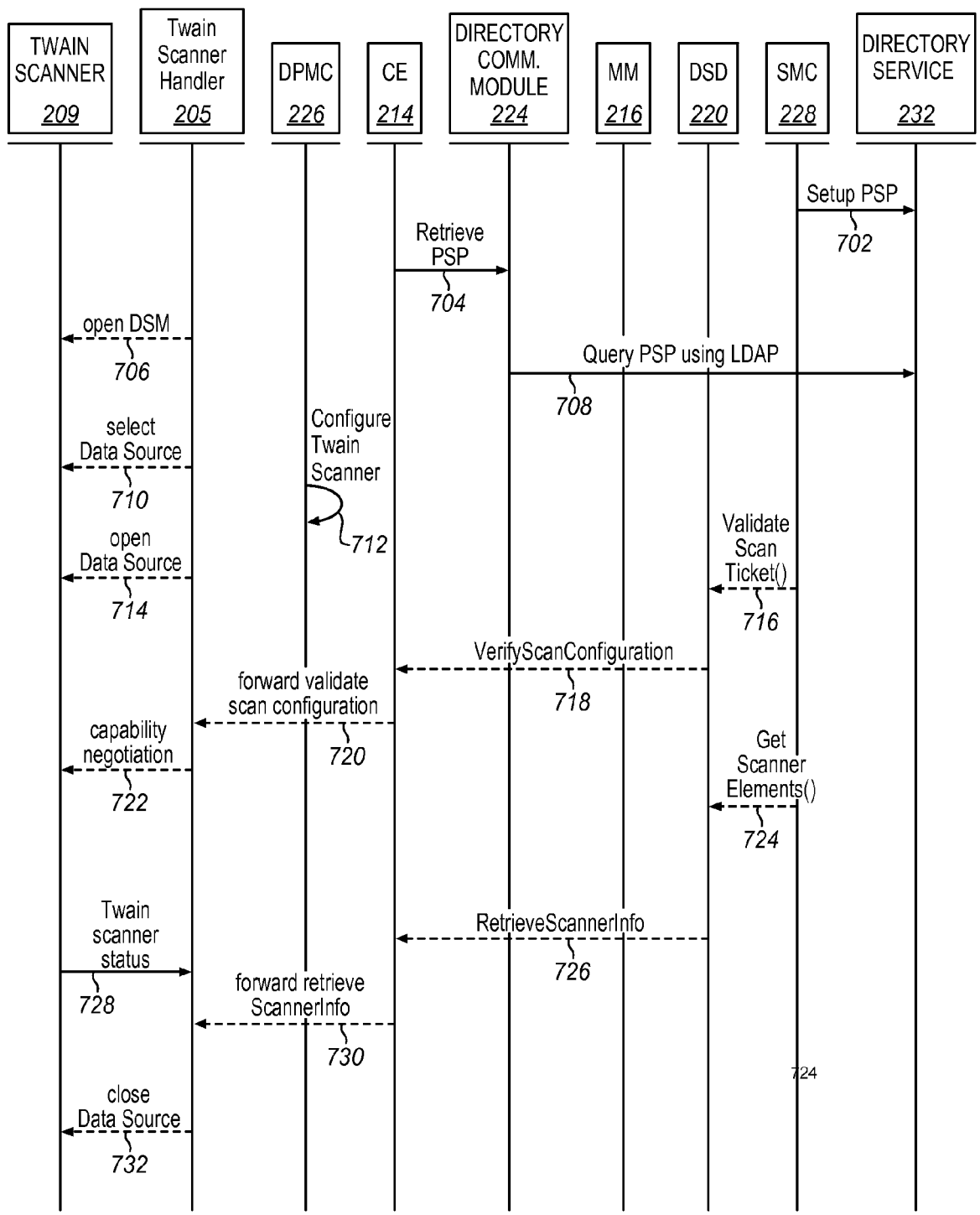

FIG. 7 illustrates an exemplary communication and processing flow utilizing proxy scan service 202 of FIG. 2 in an embodiment of the invention. In FIG. 7, configuration and management activities for Twain scanner 209 are illustrated. Generally, an administrator creates a general PSP for Twain scanner 209 using SMC 228 and stores the PSP data in directory service 232. SMC 228 may verify the scan ticket via DSD module 220. The administrator selects Twain scanner 209 and performs mapping between Twain scanner 209 and the PSP data using DPMC module 226 and remote user interface 234. Conversion engine module retrieves the PSP data from directory service 232 and caches the PSP data to reduce network traffic.

Twain scan handler 205 retrieves the PSP data for the purpose of capability negotiation with Twain scanner 209. Twain scanner 209 notifies Twain scan handler 205 about status events. SMC 228 can retrieve Twain scanner 209 capabilities using DSD module 220 and Twain scan handler 205. Specific steps of this configuration and management activity are detailed below.

In flow 702, an administrator generates a generic PSP for Twain scanner 209, and stores the PSP data in directory service 232.

In flow 704, conversion engine module 214 transmits a RetrievePSP( ) message to directory communication module 224.

In flow 706, Twain scanner handler 205 transmits an open DSM( ) request to Twain scanner 209. The open DSM( ) message identifies Twain scanner 209 as a data source.

In flow 708, directory communication service 224 queries directory service 232 using LDAP for the PSP data.

In flow 710, Twain scanner handler 205 selects Twain scanner 209 as a data source.

In flow 712, an administrator configures Twain scanner 209 and creates a mapping between Twain scanner 209 and the PSP data using remote user interface 234 and DPMC 226.

In flow 714, Twain scanner handler 205 opens Twain scanner 209 as a data source.

In flow 716, SMC 228 transmits ValidateScanTicket( ) message to DSD module 222.

In flow 718, DSD module 220 forwards a VerifyScanConfiguration( ) message to conversion engine module 214.

In flow 720, conversion engine module 214 forwards the VerifyScanConfiguration( ) message to Twain scanner handler 205

In flow 722, Twain scanner handler 205 negotiates with Twain scanner 209 for the capabilities of Twain scanner 209.

In flow 724, SMC module 724 transmits GetScannerElements( ) message to DSD module 222.

In flow 726, DSD module 220 forwards RerieveScannerinfo( ) to conversion engine module 214.

In flow 728, Twain scanner handler 205 receives status events from Twain scanner 209.

In flow 730, conversion engine module 214 forwards RetrieveScannerinfo( ) to Twain scanner handler 205.

In flow 732, Twain scanner handler 205 closes the Twain scanner 209 connection.

Figure 8:
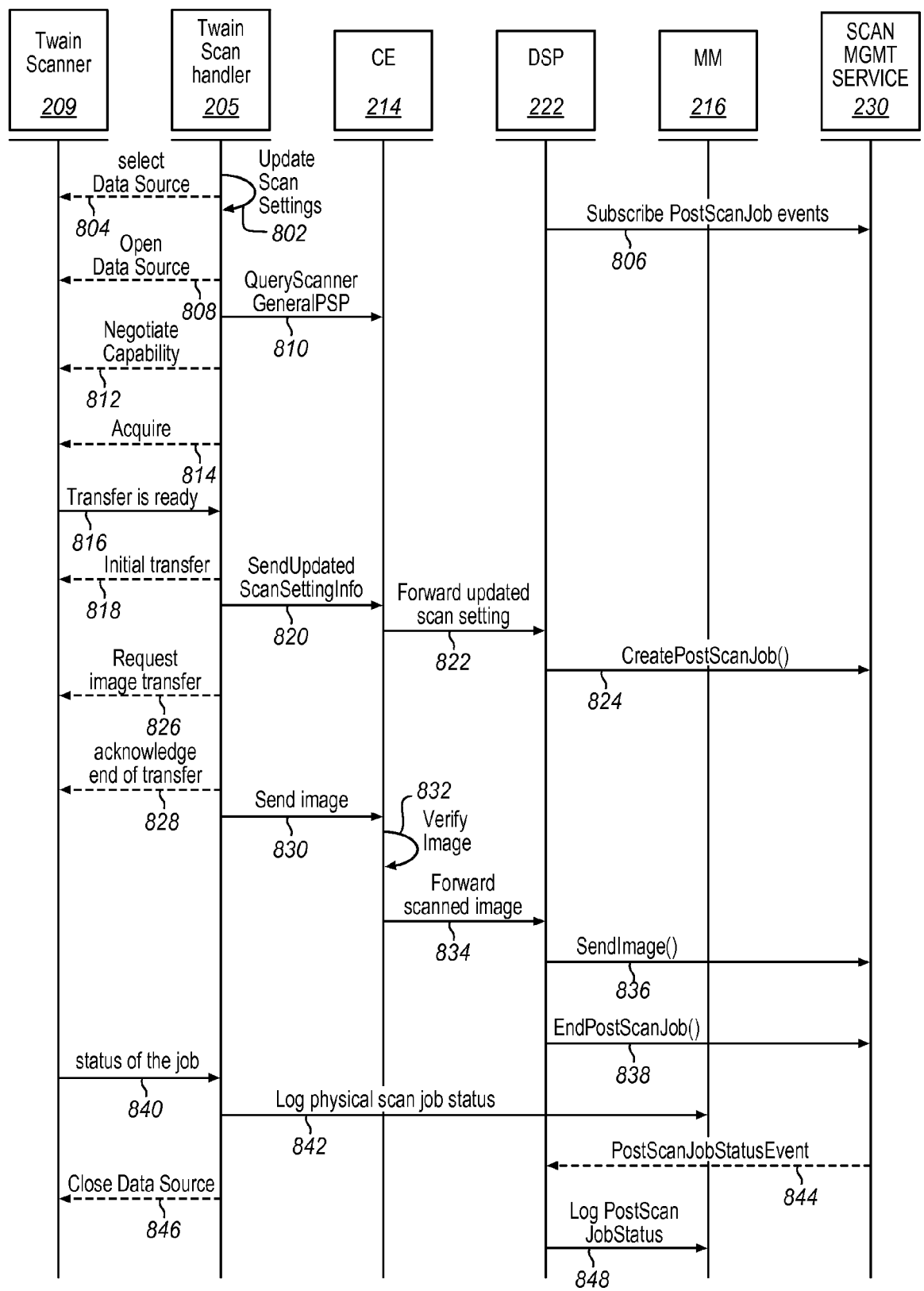

FIG. 8 illustrates an exemplary communication and processing flow utilizing proxy scan service 202 of FIG. 2 in an embodiment of the invention. In FIG. 8, a scenario is detailed whereby proxy scan service 202 is utilized using a web user interface initiate mode for Twain scanner 209. Generally, DSP module 222 subscribes to post scan job events from scan management service 230. A user selects Twain scanner 209 through a web interface and initiates a scan. Twain scan handler 205 retrieves the PSP data from conversion engine module 214 and negotiates capabilities of Twain scanner 209 based on the scan settings in the PSP data. Twain scan handler 205 also updates scan settings in the PSP data based on the scan settings negotiated with Twain scanner 209. Twain scan handler 205 then sends the updated PSP data to scan management service 230 to generate a CreatePostScanJob( ) operation. Twain scan handler 205 may then send an acquire command to Twain scanner 209 to request the scan data.

After Twain scan handler 205 receives a notification that the scan data is ready to be transferred, Twain scan handler 205 initiates a data transfer for the scan data from Twain scanner 209. Twain scan handler 205 then forwards the image data to conversion engine module 214. Conversion engine module 214 verifies the image contents of the scan data against the PSP data and processes the scan data if necessary. Conversion engine module 214 then forwards the scan data to DSP module 222 for a SendImage( ) operation with scan management service 230. After the scan data is sent, DSP module 222 sends an EndPostScanJob( ) command to scan management service 230. Scan job information and post scan job status is logged to management module 216. Specific steps of this scan activity are detailed below.

In flow 802, Twain scan handler 205 updates scan settings. A scan is started through a web user interface.

In flow 804, Twain scan handler 205 selects Twain scanner 209 as a data source.

In flow 806, DSP module 222 subscribes to post scan job events with scan management service 230.

In flow 808, Twain scan handler 205 opens Twain scanner 209 as a data source.

In flow 810, Twain scan handler 205 queries conversion engine module 214 for the general PSP data for Twain scanner 209.

In flow 812, Twain scan handler 205 negotiates for the capabilities of Twain scanner 209.

In flow 814, Twain scan handler 205 sends acquire request to Twain scanner 209.

In flow 816, Twain scanner 209 indicates to Twain scan handler 205 that data is ready to be transferred.

In flow 818, Twain scan handler 205 sends initial transfer request to Twain scanner 209.

In flow 820, Twain scan handler 205 sends updated scan settings information to conversion engine module 214. The updated scan setting information is the actual scan resolution used to generate the scan image data.

In flow 822, conversion engine module 214 forwards the updated scan settings to DSP module 222.

In flow 824, DSP module 222 creates a post scan job with scan management service 230.

In flow 826, Twain scan handler 205 requests an image transfer with Twain scanner 209.

In flow 828, Twain scan handler 205 acknowledges the end of the data transfer.

In flow 830, Twain scan handler 205 sends the image data to conversion engine module 214.

In flow 832, conversion engine module 214 verifies the image data.

In flow 834, conversion engine module 214 forwards scanned image data to DSP module 222.

In flow 836, DSP module 222 sends image data to scan management service 230.

In flow 838, DSP module 222 transmits EndPostScanJob( ) message to scan management service 230.

In flow 840, Twain scanner 209 transmits job status information to Twain scan handler 205.

In flow 842, Twain scan handler 205 logs physical scan job status to management module 216.

In flow 844, DSP module 222 receives a post scan job status event from scan management service 230.

In flow 846, Twain scan handler 205 closes the connection to Twain scanner 209.

In flow 848, DSP module 222 logs post scan job status to management module 216.

FIGS. 3-8 are illustrative in nature and depict one possible embodiment for the various communication and processing flows for proxy service 202. One skilled in the art will recognize that the various communication and processing flows may include more or fewer flows as a matter of design choice. Thus, the operation of proxy service 202 is not limited to the specific flows depicted in FIGS. 3-8.

Figure 9:
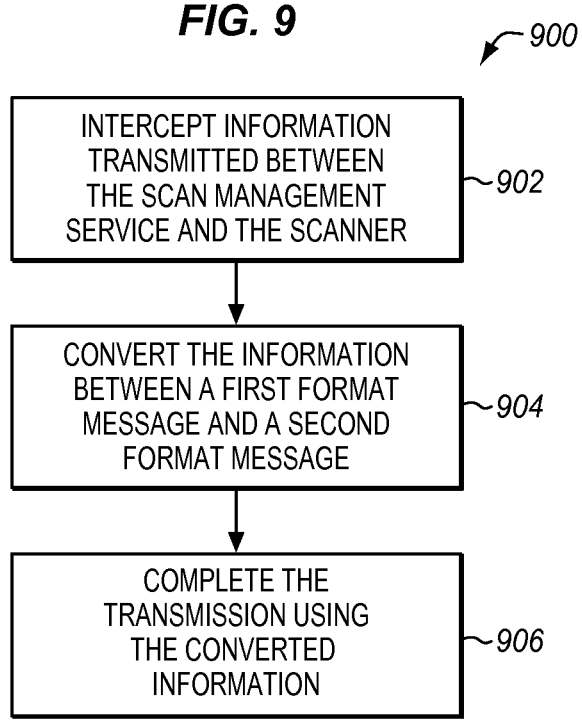
FIG. 9 is a flowchart depicting an exemplary method of operating a proxy scan service within a scanning system in an embodiment of the invention.

FIG. 9 is a flowchart depicting an exemplary method 900 of operating a proxy scan service within a scanning system (such as scanning system 100 of FIG. 1) in an embodiment of the invention.

Step 902 comprises intercepting information, at a proxy scan service, transmitted between a scan management service and a scanner. For example, the scan management service may query the scanner for its scan capabilities for a pending scan job using a GetScannerElements( ) DSD message.

Step 904 comprises converting the intercepted information between a first format message and a second format message. For example, after receiving the GetScannerElements( ) message from the scan management service, the proxy scan service converts the message into a second format message recognized by the scanner. In some embodiments, the first format message is PSP data. In other embodiments, the second format message recognized by the scanner is at least one of a Twain format message, a Windows Image Acquisition (WIA) format message, a Image and Scanner Interface Specification (ISIS) format message, or an email format message.

Step 906 comprises completing the transmission using the converted information. After the proxy scan service generates the second format message, the proxy scan service forwards the message to the scanner.

FIG. 9 depicts an exemplary method in order to teach one skilled in the art how to make and use the invention disclosed herein. One skilled in the art will recognize that the steps illustrated in FIG. 9 may be expanded or combined in various ways as a matter of design choice. Also, one skilled in the art will recognize that the steps illustrated in FIG. 9 may be embodied as programmed instructions executable by a processing system, as programmable logic, and implemented by the various embodiments, for example, with respect to scanning system 100 of FIG. 1 and by other scanning systems operable to perform the functionality disclosed for scanning system 100 herein.

Figure 10:
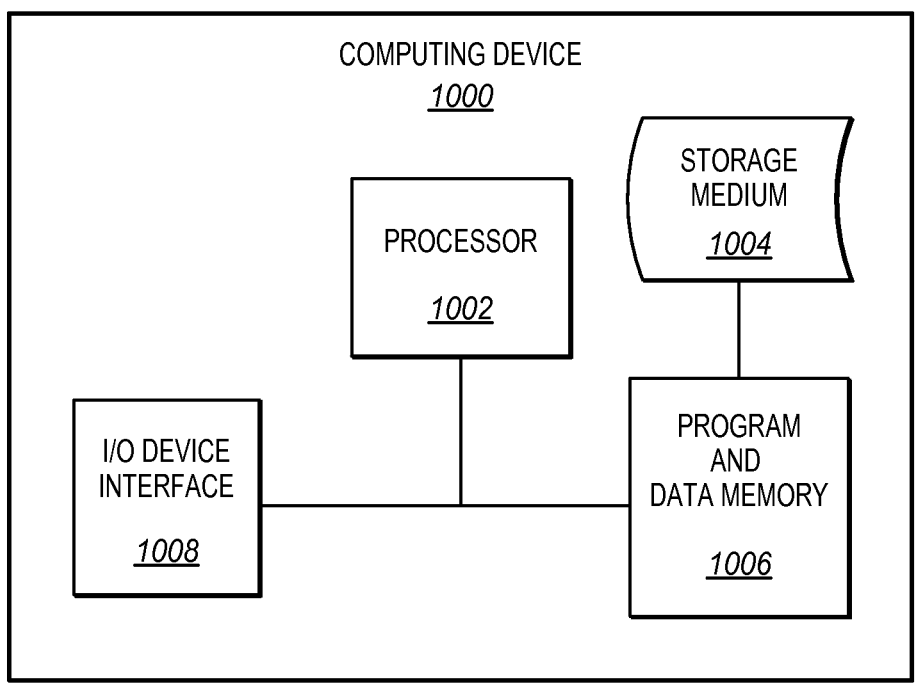
FIG. 10 is a block diagram of an exemplary computing device operating a proxy scan service in an embodiment of the invention.

FIG. 10 is a block diagram of an exemplary computing device 1000 adapted to provide proxy scan services by executing programmed instructions and accessing data stored on a computer readable storage medium 1004.

Furthermore, embodiments of the invention can take the form of a computer program product accessible from a computer-usable or computer-readable medium 1004 providing program code for use by or in connection with a computer or any instruction execution system. For the purposes of this description, a computer-usable or computer readable medium can be any apparatus that can contain, store, communicate, propagate, or transport the program for use by or in connection with the computer, instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A computing device 1000 suitable for storing and/or executing program code will include at least one processor 1002 coupled directly or indirectly to memory elements 1006. The memory elements 1006 can include local memory employed during actual execution of the program code, bulk storage, and cache memories, which provide temporary storage of at least some program code in order to reduce the number of times code must be retrieved from bulk storage during execution.

Embodiments of the invention can take the form of an entirely hardware (i.e., circuits) embodiment, an entirely software embodiment or an embodiment containing both hardware and software elements. In one embodiment, the invention is implemented in software, which includes but is not limited to firmware, resident software, microcode, etc.

Although specific embodiments were described herein, the scope of the invention is not limited to those specific embodiments. The scope of the invention is defined by the following claims and any equivalents thereof.

We claim:

1. A method of implementing legacy scanners within a Distributed Scan Management (DSM) environment, the method comprising:
   intercepting, at a proxy scan service, information transmitted between a DSM service and a legacy scanner, wherein the DSM service recognizes a first format message for the information comprising one of a Distributed Scan Processing (DSP) format message of the DSM environment and a Distributed Scan Device (DSD) format message of the DSM environment, and wherein the legacy scanner recognizes a second format message for the information that is non-compliant with at least one of the DSP format message of the DSM environment and the DSD format message of the DSM environment;
   converting, at the proxy scan service, the information between the first format message of the DSM environment and the second format message of the legacy scanner; and
   completing, at the proxy scan service, the transmission between the DSM service and the legacy scanner using the converted information.

2. The method of claim 1 wherein the second format message recognized by the legacy scanner is at least one of:
   a Twain format message,
   a Windows Image Acquisition (WIA) format message,
   an Image and Scanner Interface Specification (ISIS) format message,
   a Scanner Access Now Easy (SANE) format message, or
   an email format message.

3. The method of claim 1:
   wherein the step of intercepting further comprises:
      intercepting Post Scan Processing (PSP) data from the DSM service,
   wherein the step of converting further comprises:
      converting the PSP data into a second format message recognized by the legacy scanner, and
   wherein the step of completing further comprises:
      transmitting the converted PSP data of the second format message to the legacy scanner.

4. The method of claim 3 wherein the step of converting further comprises:
   determining that the legacy scanner does not support scan settings defined in the PSP data;
   identifying an alternate scan capability for the legacy scanner;
   receiving scan data from the legacy scanner in the alternate scan capability; and
   converting the scan data in the alternate scan capability to the scan settings defined in the PSP data, wherein the alternate scan capability comprises one or more of a scan resolution, an image format, or a color space.

5. The method of claim 1:
   wherein the step of intercepting further comprises:
      intercepting information transmitted between the DSM service and at least one of a plurality of legacy scanners, wherein the at least one of the plurality of legacy scanners recognizes a different second format message than another legacy scanner of the plurality of legacy scanners,
   wherein the step of converting further comprises:
      converting the information between a first format message recognized by the DSM service and the different second format message, and
   wherein the step of completing further comprises:
   completing the transmission between the DSM service and the at least one of the plurality of legacy scanners using the converted information.

6. A system comprising:
   a computing device operable to execute a proxy scan service for implementing legacy scanners within a Distributed Scan Management (DSM) environment, wherein the proxy scan service is adapted to be communicatively coupled with a DSM service, and wherein the DSM service is operable to recognize a first format message comprising one of a Distributed Scan Processing (DSP) format message of the DSM environment and a Distributed Scan Device (DSD) format message of the DSM environment; and
   wherein the proxy scan service is operable to intercept information transmitted between the DSM service and a legacy scanner, wherein the legacy scanner is operable to recognize a second format message that is non-compliant with at least one of the DSP format message of the DSM environment and the DSD format message of the DSM environment, and wherein the proxy scan service further includes:
      a DSD module adapted to be communicatively coupled with a Scan Management Console (SMC) service of the DSM environment, wherein the DSD module is operable to exchange a DSD message with the SMC service; and
      a DSP module adapted to be communicatively coupled with a Distributed Scan Server, wherein the DSP module is operable to exchange a DSP message with the Distributed Scan Server,
   wherein the proxy scan service is further operable to convert the information between the first format message of the DSM environment and the second format message of the legacy scanner, and wherein the proxy scan service is further operable to complete the transmission between the DSM service and the legacy scanner using the converted information.

7. The system of claim 6 wherein the proxy scan service further includes:
a scan handler operable to be communicatively coupled to the legacy scanner, and further operable to exchange the second format message of the legacy scanner, wherein the second format message comprises at least one of:
a Twain format message,
a Windows Image Acquisition (WIA) format message,
an Image and Scanner Interface Specification (ISIS) format message,
a Scanner Access Now Easy (SANE) format message, or
an email format message.

8. The system of claim 6 wherein the proxy scan service further includes:
an Active Directory (AD) module operable to be communicatively coupled with an AD service, and further operable to exchange Post Scan Processing (PSP) data with the AD service;
a Conversion Engine (CE) module communicatively coupled with the AD module, wherein the CE module is operable to convert the PSP data into intermediate format data; and
a scan handler module communicatively coupled with the CE module and adapted to be communicatively coupled with the legacy scanner, wherein the scan handler module is operable to exchange the intermediate format data with the CE, is further operable to convert the intermediate format data into the second format message recognized by the legacy scanner, and is further operable to exchange the second format message with the legacy scanner.

9. The system of claim 8 wherein the CE module is further operable to determine that the legacy scanner does not support scan settings defined in the PSP data,
wherein the CE module is further operable to query the scan handler module to identify an alternate scan capability for the legacy scanner,
wherein the scan handler module is further operable to instruct the legacy scanner to generate scan data in the alternate scan capability, and is further operable to forward the scan data received from the legacy scanner in to the CE module in the intermediate format, and
wherein the CE module is further operable to convert the scan data in the alternate scan capability to the scan settings defined in the PSP data, wherein the alternate scan capability comprises one or more of a scan resolution, an image format, or a color space.

10. The system of claim 6:
wherein the proxy scan service further includes a plurality of scan handler modules, each adapted to be communicatively coupled with a corresponding one of a plurality of legacy scanners based on the second format message recognized by a corresponding legacy scanner, wherein at least one of the plurality of legacy scanners recognizes a different second format message than another legacy scanner of the plurality of legacy scanners,
wherein the proxy scan service is further operable to intercept information transmitted between the DSM service and the plurality of legacy scanners,
wherein the proxy scan service is further operable to convert the information between a first format message recognized by the DSM service and an intermediate format, wherein at least one of the scan handlers is adapted to be communicatively coupled with the at least one of the plurality of legacy scanners recognizing the different second format message,
wherein the at least one of the scan handlers is operable to convert the intermediate format data into the different second format message, and
wherein the at least one of the scan handlers is operable to complete the transmission between the DSM service and the at least one of the plurality of legacy scanners by exchanging the different second format message.

11. The of claim 6 wherein the proxy scan service and the DSM service are both operable to execute on the computing device.

12. The of claim 11 wherein the computing device is a distributed scan server.

13. A non-transitory computer readable medium tangibly embodying programmed instructions which, when executed by a computing device, are operable to perform a method of providing proxy scan services for implementing legacy scanners within a Distributed Scan Management (DSM) environment, the method comprising:
intercepting, at the proxy scan service, information transmitted between a DSM service and a legacy scanner, wherein the DSM service recognizes a first format message for the information comprising one of a Distributed Scan Processing (DSP) format message of the DSM environment and a Distributed Scan Device (DSD) format message of the DSM environment, and wherein the legacy scanner recognizes a second format message for the information that is non-compliant with at least one of the DSP format message of the DSM environment or the DSD format message of the DSM environment;
converting, at the proxy scan service, the information between the first format message of the DSM environment and the second format message of the legacy scanner; and
completing, at the proxy scan service, the transmission between the DSM service and the legacy scanner using the converted information.

14. The non-transitory computer readable medium of claim 13 wherein the DSM service comprises at least one of a Distributed Scan Server and a Scan Management Console.

15. The non-transitory computer readable medium of claim 13 wherein the second format message recognized by the legacy scanner is at least one of:
a Twain format message,
a Windows Image Acquisition (WIA) format message,
an Image and Scanner Interface Specification (ISIS) format message,
a Scanner Access Now Easy (SANE) format message, or
an email format message.

16. The non-transitory computer readable medium of claim 13:
wherein the method step of intercepting further comprises steps for:
intercepting Post Scan Processing (PSP) data from the DSM service,
wherein the step of converting further comprises:
converting the PSP data into one or more second format messages recognized by the legacy scanner, and
wherein the method step of completing further comprises steps for:
transmitting the converted PSP data of the one or more second format messages to the legacy scanner.

17. The non-transitory computer readable medium of claim 16 wherein the method step of converting further comprises steps for:
- determining that the legacy scanner does not support scan settings defined in the PSP data;
- identifying an alternate scan capability for the legacy scanner;
- receiving scan data from the legacy scanner in the alternate scan capability; and
- converting the scan data in the alternate scan capability to the scan settings defined in the PSP data, wherein the alternate scan capability comprises one or more of a scan resolution, an image format, or a color space.

18. The non-transitory computer readable medium of claim 13:
- wherein the method step of intercepting further comprises steps for:
  - intercepting information transmitted between the DSM service and the at least one of the plurality of legacy scanners, wherein the at least one of the plurality of legacy scanners recognizes a different second format message than another legacy scanner of the plurality of legacy scanners,
- wherein the method step of converting further comprises steps for:
  - converting the information between a first format message recognized by the DSM service and the different second format message, and wherein the method step of completing further comprises steps for:
  - completing the transmission between the DSM service and the at least one of the plurality of legacy scanners using the converted information.

19. The method of claim 1 wherein the DSM service comprises at least one of a Distributed Scan Server and a Scan Management Console.

* * * * *